United States Patent
Clemens et al.

(10) Patent No.: US 9,594,201 B2
(45) Date of Patent: Mar. 14, 2017

(54) CURVED VOLUME PHASE HOLOGRAPHIC (VPH) DIFFRACTION GRATING WITH TILTED FRINGES AND SPECTROGRAPHS USING SAME

(71) Applicant: The University of North Carolina at Chapel Hill, Chapel Hill, NC (US)

(72) Inventors: J. Christopher Clemens, Chapel Hill, NC (US); Darragh Evelyn Anthony Adam O'Donoghue, Cape Town (ZA)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 51 days.

(21) Appl. No.: 14/414,610

(22) PCT Filed: Jul. 15, 2013

(86) PCT No.: PCT/US2013/050499
§ 371 (c)(1),
(2) Date: Jan. 13, 2015

(87) PCT Pub. No.: WO2014/012095
PCT Pub. Date: Jan. 16, 2014

(65) Prior Publication Data
US 2015/0168625 A1    Jun. 18, 2015

Related U.S. Application Data

(60) Provisional application No. 61/671,515, filed on Jul. 13, 2012.

(51) Int. Cl.
*G02B 5/32*    (2006.01)
*G01J 3/45*    (2006.01)
(Continued)

(52) U.S. Cl.
CPC .......... *G02B 5/32* (2013.01); *B29D 11/00769* (2013.01); *G01J 3/021* (2013.01);
(Continued)

(58) Field of Classification Search
CPC ....................................................... G02B 5/32
(Continued)

(56) References Cited

U.S. PATENT DOCUMENTS

| 3,674,334 A | 7/1972 | Offner |
| 3,748,015 A | 7/1973 | Offner |

(Continued)

FOREIGN PATENT DOCUMENTS

WO    WO 2011/143740 A1    11/2011

OTHER PUBLICATIONS

Final Office Action for U.S. Appl. No. 13/942,306 (Jan. 14, 2016).
(Continued)

*Primary Examiner* — Kimberly N Kakalec
(74) *Attorney, Agent, or Firm* — Jenkins, Wilson, Taylor & Hunt, P.A.

(57) ABSTRACT

The subject matter described herein includes a curved VPH grating with tilted fringes and spectrographs, both retroreflective and transmissive, that use such gratings. A VPH grating according to the subject matter described herein includes a first curved surface for receiving light to be diffracted. The grating includes an interior region having tilted fringes to diffract light that passes through the first surface. The grating further includes a second curved surface bounding the interior region on a side opposite the first surface and for passing light diffracted by the fringes.

5 Claims, 9 Drawing Sheets

(51) Int. Cl.
| | |
|---|---|
| *G01J 3/02* | (2006.01) |
| *G03H 1/04* | (2006.01) |
| *G03H 1/18* | (2006.01) |
| *G03H 1/02* | (2006.01) |
| *G03H 1/00* | (2006.01) |
| *G01J 3/10* | (2006.01) |
| *B29D 11/00* | (2006.01) |

(52) U.S. Cl.
CPC . *G01J 3/10* (2013.01); *G01J 3/45* (2013.01); *G03H 1/0005* (2013.01); *G03H 1/0248* (2013.01); *G03H 1/041* (2013.01); *G03H 1/181* (2013.01); *G01J 2003/102* (2013.01); *G01J 2003/452* (2013.01); *G03H 2001/026* (2013.01); *G03H 2001/0439* (2013.01); *G03H 2001/185* (2013.01)

(58) Field of Classification Search
USPC ............... 359/3–8; 264/1.1–2.7, 239–339; 425/406–423, 452–595; 430/2
See application file for complete search history.

(56) References Cited

U.S. PATENT DOCUMENTS

| | | | |
|---|---|---|---|
| 4,076,772 A * | 2/1978 | Murbach | G03C 1/66 264/1.31 |
| 4,834,474 A | 5/1989 | George et al. | |
| 5,343,289 A | 8/1994 | Crawford et al. | |
| 5,363,220 A | 11/1994 | Kuwayama et al. | |
| 5,726,782 A | 3/1998 | Kato et al. | |
| 6,139,146 A | 10/2000 | Zhang | |
| 6,266,140 B1 | 7/2001 | Xiang et al. | |
| 6,315,929 B1 * | 11/2001 | Ishihara | B29D 11/00432 249/114.1 |
| 7,518,722 B2 | 4/2009 | Julian et al. | |
| 7,697,137 B2 | 4/2010 | Comstock, II | |
| 8,097,465 B2 | 1/2012 | Millington | |
| 2005/0270607 A1 | 12/2005 | Moser et al. | |
| 2006/0017924 A1 | 1/2006 | Kowarz et al. | |
| 2009/0051988 A1 * | 2/2009 | Sasaki et al. | G03F 7/001 359/3 |
| 2009/0195778 A1 | 8/2009 | Yankov | |
| 2010/0178496 A1 * | 7/2010 | Masuda et al. | C09J 7/00 428/347 |
| 2011/0089315 A1 | 4/2011 | Walt et al. | |
| 2011/0228267 A1 | 9/2011 | Hayashi | |
| 2014/0022615 A1 | 1/2014 | Clemens et al. | |

OTHER PUBLICATIONS

Non-Final Office Action for U.S. Appl. No. 13/942,306 (Jun. 29, 2015).
O'Donoghue et al., "Spherical Grating Spectrometers," Proc. of SPIE, vol. 9147, pp. 1-8 (2014).
Clemens et al., "Curved VPH gratings for novel spectrographs," Proc. of SPIE, vol. 9151, pp. 1-7 (2014).
Chonis et al., "Mass production of volume phase holographic gratings for the VIRUS spectrograph array", Proc. of SPIE, vol. 9151, pp. 1-16 (2014).
Hill et al., "Virus: production of a massively replicated 33k fiber integral field spectrograph for the upgraded Hobby-Eberly Telescope," Proc. of SPIE, vol. 8446, pp. 1-20 (2012).
Tuttle et al., "Fireball: The first ultraviolet fiber fed spectrograph," Proc. of SPIE, vol. 7732, pp. 1-15 (2010).
Nordsieck et al., "Ultraviolet compatibility tests of lens coupling fluids used in astronomical instrumentation," Proc. of SPIE, vol. 7735, pp. 1-7 (2010).
Hill et al., "Virus: a massively replicated 33k fiber integral field spectrograph for the upgraded Hobby-Eberly Telescope," Proc. of SPIE, vol. 7735, pp. 1-21 (2010).
Tuttle et al., "The FIREBall fiber-fed UV spectrograph", Proc. of SPIE, vol. 7014, pp. 1-11 (2008).
Crain et al., "The Goodman spectrograph control system," Ground-based Instrumentation for Astronomy, Proceedings of SPIE, vol. 5496, pp. 455-462 (2004).
Barden et al., "Volume-Phase Holographic Gratings and the Efficiency of Three Simple Volume-Phase Holographic Gratings," Publications of the Astronomical Society of the Pacific, vol. 112, No. 772, pp. 809-820. (Jun. 2000).
Mouroulis et al., "Design of pushbroom imaging spectrometers for optimum recovery of spectroscopic and spatial information", Applied Optics, vol. 39, No. 13, pp. 2210-2220 (May 1, 2000).
Clemens et al., "Optics for a Volume Holographic Grating Spectrograph for the Southern Astrophysical Research (SOAR) Telescope," Optical and IR Telescope Instrumentation and Detectors, Proceedings of SPIE, vol. 4008, pp. 1423-1435 (2000).
Hilyard et al., "Chemical Reactivity Testing of Optical Fluids and Materials in the DEIMOS Spectrographic Camera for the Keck II Telescope," Part of the SPIE Conference on Optomechanical Design and Engineering, SPIE vol. 3786, pp. 482-492 (1999).
Arns et al., "Volume phase gratings for spectroscopy, ultrafast laser compressors, and wavelength division multiplexing," Part of the SPIE Conference on Current Developments in Optical Design, SPIE vol. 3779, pp. 313-323 (Jul. 1999).
Epps, "Development of large high-performance lenses for astronomical spectrographs," Part of the SPIE Conference on Optical Astronomical Instrumentation, Proc. of SPIE, vol. 3355, pp. 111-128 (Mar. 1998).
Barden et al., "Volume-phase holographic gratings and their potential for astronomical applications," Part of the SPIE Conference on Optical Astronomical Instrumentation, SPIE vol. 3355, pp. 866-876 (Mar. 1998).
Miller et al., "The Visual and Infrared Mapping Spectrometer for Cassini," SPIE, vol. 2803, pp. 206-220 (1996).
Reininger et al., "Visible infrared mapping spectrometer—visible channel (VIMS-V)," SPIE, vol. 2198, pp. 239-250 (1994).
Mertz, "Concentric spectrographs," Applied Optics, vol. 16, No. 12, pp. 3122-3124 (Dec. 1977).
Offner, "New Concepts in Projection Mask Aligners," Optical Engineering, vol. 14, No. 2, pp. 130-132 (Mar.-Apr. 1975).
Notification of Transmittal of the International Search Report and the Written Opinion of the International Searching Authority, or the Declaration for International Application No. PCT/US2013/050499 (Jan. 20, 2014).
Clemens et al., "The Goodman Spectrograph," pp. 1-10 (Sep. 30, 2004).
Non-Final Office Action for U.S. Appl. No. 13/942,306 (Jun. 7, 2016).
Final Office Action for U.S. Appl. No. 13/942,306 (Jan. 4, 2017).
Application-Initiated Interview Summary for U.S. Appl. No. 13/942,306 (Nov. 8, 2016).

* cited by examiner

CURVED VOLUME PHASE HOLOGRAPHIC (VPH) DIFFRACTION GRATING WITH TILTED FRINGES AND SPECTROGRAPHS USING SAME

PRIORITY CLAIM

This application claims the benefit of U.S. Provisional Patent Application Ser. No. 61/671,515, filed Jul. 13, 2012; the disclosure of which is incorporated herein by reference in its entirety.

TECHNICAL FIELD

The subject matter described herein relates to VPH diffraction gratings. More particularly, the subject matter described herein relates to curved volume phase holographic (VPH) diffraction grating with tilted fringes and spectrographs using same.

BACKGROUND

Diffraction gratings are used in spectrographs and other applications to diffract light and separate light into component colors or wavelengths. One conventional type of diffraction grating is a ruled or surface relief grating, which may be transmissive or non-transmissive, and which diffracts light using grooves or other surface features. One problem with ruled gratings is that the grooves or surface features have to be mechanically machined in the surface of the grating and maintaining constant spacing between grooves or surface features is difficult. This can be addressed by well-known methods to optically record and etch features in the surface, but achieving high efficiency requires control of the shape of the grooves, which is difficult by etching.

Another type of grating used in spectrographs is a phase grating. Phase gratings are transmissive and can be more efficient than non-transmissive gratings. Phase gratings incorporate structures that diffract light by changing its phase as it passes through the grating. Phase gratings are easier to manufacture than non-transmissive gratings because the holographic fringes that produce the diffracting structures can be produced using interfering laser beams and recorded as refractive index changes in a variety of transparent media.

It is desirable to have phase gratings that are curved or spherically shaped for some advantageous spectrograph designs. However, recording fringes in spherical phase gratings for some applications is difficult, especially when the application requires careful control of the fringe tilt angle and the spacing between fringes.

Accordingly, there exists a need for a curved VPH diffraction grating with tilted fringes and spectrographs that use such a grating.

SUMMARY

According to one aspect, the subject matter described herein includes a curved VPH grating with tilted fringes and spectrographs, both retroreflective and transmissive, that use such gratings. A VPH grating according to the subject matter described herein includes a first curved surface for receiving light to be diffracted. The grating includes an interior region having tilted fringes to diffract light that passes through the first surface. The grating further includes a second curved surface bounding the interior region on a side opposite the first surface and for passing light diffracted by the fringes.

BRIEF DESCRIPTION OF THE DRAWINGS

The subject matter described herein will now be explained with reference to the accompanying drawings of which.

DETAILED DESCRIPTION

The subject matter described herein includes a curved VPH grating with tilted fringes and spectrographs that use such a grating. The curved VPH grating described herein can be used as a single pass transmissive VPH grating for transmissive spectrograph designs or as a two pass grating where incident light passes through in zero$^{th}$ order and reflected light is diffracted and travels on a path that is nearly the same as the incident light, reducing the mirror size of conventional Offner spectrograph designs.

Figure 1:
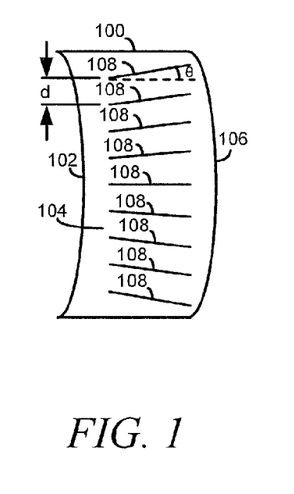
FIG. 1 is a schematic diagram of a curved VPH grating with tilted fringes according to an embodiment of the subject matter described herein.

FIG. 1 is a schematic diagram illustrating a curved VPH grating with tilted fringes according to an embodiment of the subject matter described herein. Referring to FIG. 1, grating 100 may be formed of any optically transparent material, such as dichromated gelatin. Grating 100 includes a concave surface 102, an interior region 104, and a convex surface 106. Surfaces 102 and 106 may extend parallel to each other and may have spherical profile, i.e., conforming to a portion of the surface of a sphere. Alternatively, surfaces 102 and 106 may have a curved profile that is not spherical. Interior region 104 includes tilted fringes 108 where each fringe tilt angle is preferably constant with respect to light rays as they travel through interior region 104. It is also preferable that fringes 108 are substantially equally spaced from each other.

Maintaining a constant fringe tilt angle with respect to light rays traveling through grating 100 requires that the tilt angles of individual fringes vary from those of other fringes because grating 100 is curved and will in general be illuminated with a diverging or converging beam. Thus, in FIG. 1, the distance d between fringes 108 is preferably maintained constant. However, the tilt angle θ of each fringe 108 may differ from the tilt angles of other fringes, depending on the angles of different light rays as they travel through region 104. Exemplary methods for manufacturing such a grating will be described in more detail below.

Figure 2:
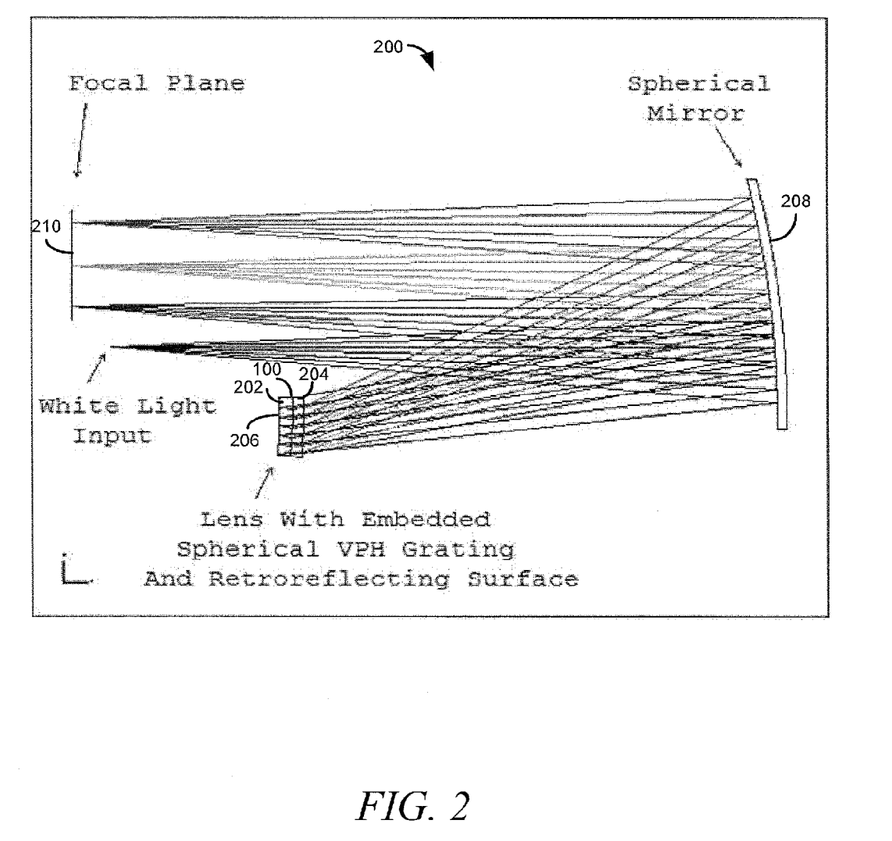
FIG. 2 is a schematic diagram of a spectrograph incorporating a curved VPH grating with tilted fringes and a reflecting surface according to an embodiment of the subject matter described herein.

In one embodiment, grating 100 may be used in a retroreflective spectrograph design, referred to herein as a "half Offner" spectrograph, as the design described herein reduces the size of the main mirror used in an Offner spectrograph by a factor of at least one half. FIG. 2 illustrates a half Offner spectrograph design 200 where grating 100 is used to pass incident light in zero$^{th}$ order and to diffract in first order reflected light along substantially the same path as the incident light to the same portion of the main mirror. In FIG. 2, grating 100 is located between lenses 202 and 204. A reflective back surface 206 is positioned on the side of lens 202 that is opposite the side that contacts grating 100. In the spectrographic design illustrated in FIG. 2, white light from a light source strikes a spherical mirror 208. The white light is reflected through lens 204, grating 100, and lens 202. Back surface 206 reflects the light back through grating 100. The reflected light is diffracted in first order as it passes back through grating 100. The diffracted light hits spherical mirror 208 at substantially the same place or region as the incident light and is reflected back to focal plane 210 for analysis. Because the retroreflected light impacts mirror 208 in substantially the same region as the incident light, the size of mirror 208 can be reduced over conventional Offner spectroscope designs where the incident light and the reflected light strike different regions of the mirror. In addition, because a VPH grating is used, the design illustrated in FIG. 2 is more efficient than half Offner spectrograph designs that use reflective surface relief gratings.

Figure 3:
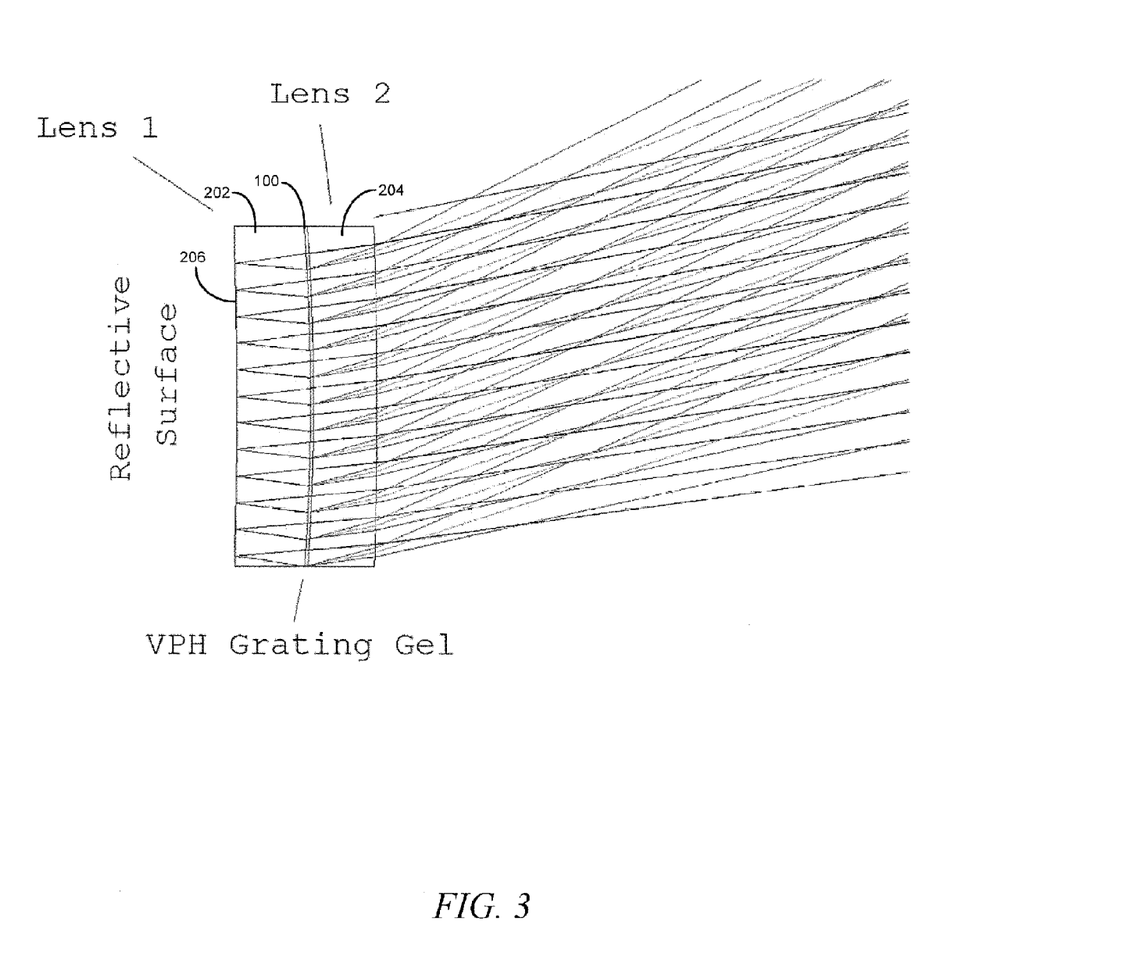
FIG. 3 is a schematic diagram of a curved VPH grating showing optical paths in a retroreflecting spectrograph design according to an embodiment of the subject matter described herein.

FIG. 3 is a close up view illustrating the operation of curved VPH grating 100 in a retroreflective design in more detail. In FIG. 3, the incident light passes through lens 204, through grating 100 in zeroth order, i.e., without diffraction, and through lens 202. The incident light reflects from reflective surface 206 located on the back side of lens 202 to enter grating 100 at a different angle from the incident light. At this new angle, the light is efficiently diffracted in first order by fringes within grating 100 before exiting the grating structure. The combined reflection from the back surface of lens 202, which serves as the grating substrate and the subsequent diffraction by the holographic film retroreflects the incoming beam. By "retroreflects" it is meant that the reflected light travels along a path that is close (though not identical) to the same path as the incident light. The interference fringes used to record grating 100 create a structure in the film to diffract the incident light into its component colors. The diffracted light is incident on the same region of the main mirror as the incident light (see FIG. 2), which allows the diameter of the main mirror to be reduced by a factor of about one half of that used in a conventional Offner spectrograph.

In FIG. 3, diffraction grating 100 is located between lenses 202 and 204, and reflective surface 202 is located on one of the lenses. In an alternate embodiment, lens 202 may be replaced with any rigid material of the proper shape, and reflective surface 206 may be placed directly in contact with the back surface of diffraction grating 100. Reflective surface 206 may be formed from any suitable surface that reflects light, but preferably incorporates a rigid cover that protects the holographic film. For example, the reflective surface may be a silver or aluminum based material that is deposited on the surface of a metal or glass mirror that is in direct contact with the diffracting film.

In the design illustrated in FIG. 3, grating 100 is spherical. In an alternate design, grating 100 may be optically flat. If an optically flat grating is used, incident light may contact the grating at a constant angle. Fringes within the grating may also have a constant angle. The mirror located on the back side of the grating may also be optically flat, such that reflected light will contact the fringes at an angle that causes diffraction and reflection to the same region of the main mirror as the incident light.

Figure 4:
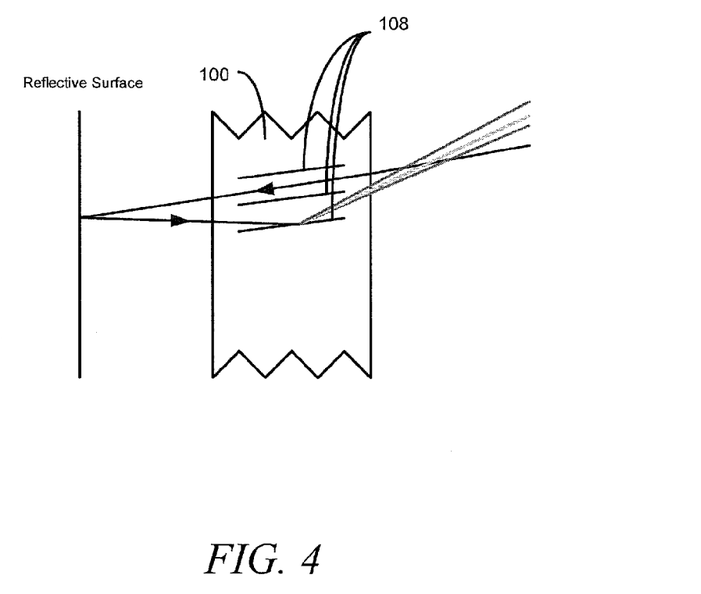
FIG. 4 is a schematic diagram showing holographic fringes within a curved VPH grating used in a retroreflective spectrograph design according to an embodiment of the subject matter described herein.

FIG. 4 is a schematic view of a portion of grating 100 illustrated in FIG. 3 showing the diffracting structures, i.e., the recorded fringes, which were recorded by exposure to the interference fringes. In FIG. 4, recorded fringes 108 pass incident light in zero$^{th}$ order and diffract the reflected light. Recorded fringes 108 are regions within grating 100 where the index of refraction is increased with respect to surrounding regions. Recorded fringes 108 are created by exposing the grating gel to the fringes created by interfering laser beams. To create structures that pass the incident light in zero$^{th}$ order and that diffract the reflected light, the angle of the fringes must be selected according to the angle at which the incident light will enter the grating and the angle at which the reflected light will enter the grating. These angles are selected based on optical geometries created by the positioning of the source, the main mirror, the grating, and the reflective surface. During holographic encoding, the angles of fringes 108 are carefully controlled by setting the angles of the recording mirrors and the tilt of the film holder. Recording may be effected on a stabilized optical table in a chamber in which air flow is carefully controlled to reduce vibration of the grating during exposure to the interfering lasers.

Figure 5:
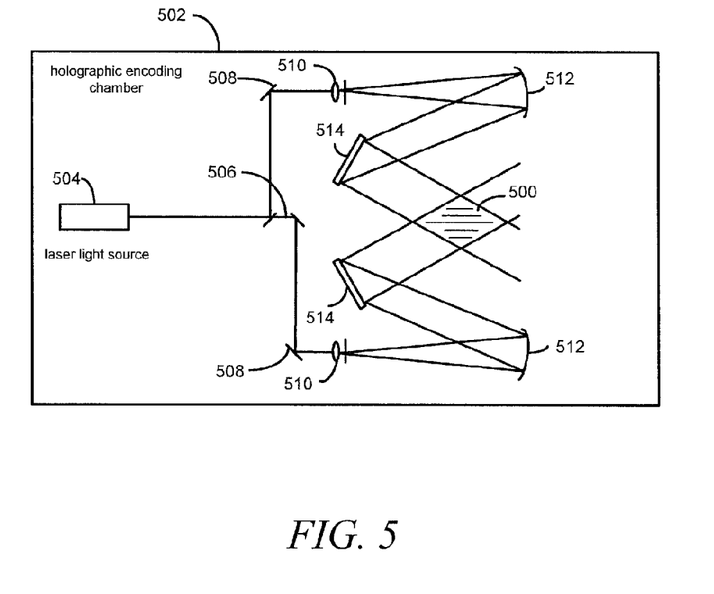
FIG. 5 is a schematic diagram illustrating one exemplary process for recording tilted fringes in a curved VPH grating according to an embodiment of the subject matter described herein.

FIG. 5 is a schematic diagram of one exemplary setup for holographic encoding of the diffraction grating according to an embodiment of the subject matter described herein. In FIG. 5, a grating material is placed in a fringe region 500 in a holographic recording chamber 502. Fringe region 500 is created by interfering collimated laser light beams created from a laser light source 504. Laser light source 504 produces a laser light beam, which is split into separate beams by a splitter 506. The separate light beams are reflected by splitter 506 to opposite sides of chamber 502 where they are reflected by mirrors 508, expanded by expanders 510, and collimated by collimators 512. The collimated, expanded laser light beams strike tilted mirrors 514, which are tilted so that the beams cross each other to create fringe region 500. The fringes in region 500 pass through the grating gel at the desired tilt angle and separation due to the spacing of the fringes and the tilt of the film holder. When the hardened grating gel is placed in a holder in region 500, recorded fringes of the desired tilt angles and separation are created in the grating.

The recording beams may be collimated laser light, or they may be laser light emitted from a pinhole and having spherical wavefronts. In cases where the recording beams have spherical wavefronts, it is possible to choose the radius curvature of the recording beams so that the recorded fringes maintain the desired angles with respect to the normal of a curved grating surface, or have other desirable aberration correcting properties. In all cases the image of the interference fringes produced by the mutually coherent laser beams is recorded in the film, and upon development by known processes, the recorded fringes become structures of higher refractive index in the film, which are capable of diffracting light by altering its phase.

According to another aspect of the subject matter described herein, a method for making a VPH grating is provided. The method allows the production of volume phase holographic gratings on substrates of arbitrary curvature. The method requires a mold whose surface has the same shape as the substrate. In one example, the mold and the substrate are spherical lenses of the desired curvature. This mold is coated with a release agent. In one example, the release agent that can be used is RainX™. A liquid gelatin is applied to the mold by pouring, brushing, dipping, or other method. In one example, the liquid gelatin material used is dichromated gelatin (DCG). The mold and substrate are then pressed together with shims around the perimeter to hold the intended separation. In one example, the shims used were tape formed of a Mylar material and having a thickness of about 1-2 thousandths of an inch. An overhang is left on at least one edge to allow separation of the mold and substrate. The mold and substrate assembly are then weighted and placed on a cold surface which causes the gelatin to congeal. After congealing, the mold is separated and the gelatin is dried, whereupon it shrinks to the final intended film thickness. The film is then exposed to holographic fringes as described above and developed to produce a diffractive element of the same curvature as the substrate. Using this method, we have fabricated a novel spherical volume phase holographic (sVPH) transmission grating with a reflective backing. The volume grating structures responsible for diffraction are tilted to allow the zero$^{th}$ order incoming light to pass through from the front, and upon reflection from the rear surface, to meet the Bragg condition for efficient scattering into first order, which will then be retroreflected back along the direction of the input beam. With this device, we have been able to redesign a well-known kind of spectrograph (the Offner spectrograph) so that the spherical VPH element replaces the usual convex surface relief grating. However, the retroreflecting properties of our grating allow the large spherical mirror in the Offner spectrograph to be halved in diameter. This is because the beam that usually reflects off the grating to the opposite side of the main mirror is retroreflected back to the same side it entered. The result is very near to the most minimal spectrograph that can be conceived, consisting of only two elements, yet it retains all the excellent optical characteristics of the Offner design.

Exemplary applications of the spectrographs and optical gratings described herein include astronomy, biophysics, lithography, optical coherence tomography, earth imaging, and medical imaging. For example, in astronomy, a spectrograph with a retroreflective optical diffraction grating according to the subject matter described herein may be used in a system, such as a telescope, to disperse an image into a spectral image and to direct the spectral image to a desired location, such as the location of a detector or a cold stop. In spectral domain optical coherence tomography, a spectrograph of the type herein described may be fed with fibers carrying polarized light that has been scattered from a sample to produce a spectral image of an interference pattern that includes depth information about the sample. In earth imaging, a spectrograph with a retroreflective optical diffraction grating as described herein may be used to image the ground from an aircraft or satellite, and to disperse the image into separate spectral bands.

Spherical Transmission Grating Spectrograph Employing a Curved Transmission VPH Grating According to another aspect, the subject matter described herein includes a spectrograph design (referred to herein as a spherical transmission grating spectrograph (STGS)) that makes use of a curved volume phase holographic grating with tilted fringes. In one exemplary implementation of the STGS design, the grating is a spherically curved volume phase holographic grating, as illustrated in FIG. 1, used in transmission: i.e., the light enters through one side (the cover plate), passes through the dichromated gelatin which comprises the grating, and exits on the other side (the substrate). When used in this manner, the grating illustrated in FIG. 1 functions as a transmission volume phase holographic grating that employs a curved surface on the grating gelatin itself. Additionally, the surfaces of the cover plate and substrate that are not in contact with the grating may also be curved. However, the radius of curvature of the non-contacting surfaces may be different from that of the surfaces of the grating.

Another feature of this grating is that the optical design of the STGS spectrograph requires that the grating have recorded fringes which are tilted in such a way that the Bragg condition required for efficient diffraction is met for light incident along the local normal to the grating surface, i.e., 90 degrees to the surface tangent). One method for recording the optimum fringe tilts introduces a recording lens into the laser interferometer. The recording lens may be placed in direct contact with the gelatin film.

The STGS spectrograph is simple, employing the curved transmission grating described above, and a single spherical mirror. The resulting instrument is smaller, lighter, and simpler than prior designs. These advantages arise from the balancing of the optical aberrations of the curved transmission grating by a single spherical mirror when illuminated off axis by the dispersed light from the grating, as illustrated in FIG. 6.

Figure 6:
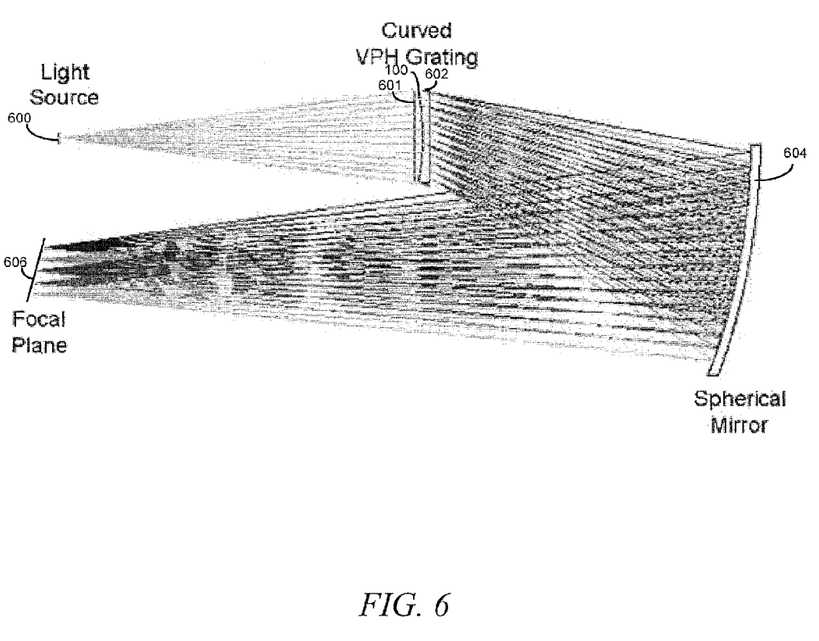
FIG. 6 is a schematic diagram illustrating a spherical VPH grating with tilted fringes used in a transmissive spectrograph design according to an embodiment of the subject matter described herein.

FIG. 6 illustrates a STGS spectrograph employing a curved VPH grating 100 and the passage of light through the spectrograph according to an embodiment of the subject matter described herein. In the example illustrated in FIG. 6, the light travels in diverging rays from the emitting source 600 to grating 100 which it enters via a cover plate 601. After being diffracted by grating 100 in first order, the light exits through a substrate 602, traveling onwards to a spherical mirror 604, which focuses the dispersed light into a spectrum on focal plane 606. One advantage of such a design is, like the half Offner, a halving in size, cost, and weight of the largest element in the spectrograph, which is the spherical mirror. The design is superior to the half Offner in so far as it removes the need for two reflections off spherical mirrors. Recording the fringes in the half Offner's retroreflecting grating to be efficient in zero$^{th}$ order on the first pass, and efficient in first order on the second pass, is quite challenging. The spectrograph design in FIG. 6 involves only one passage of the light through the grating, and therefore the problem just mentioned does not arise.

Figure 7:
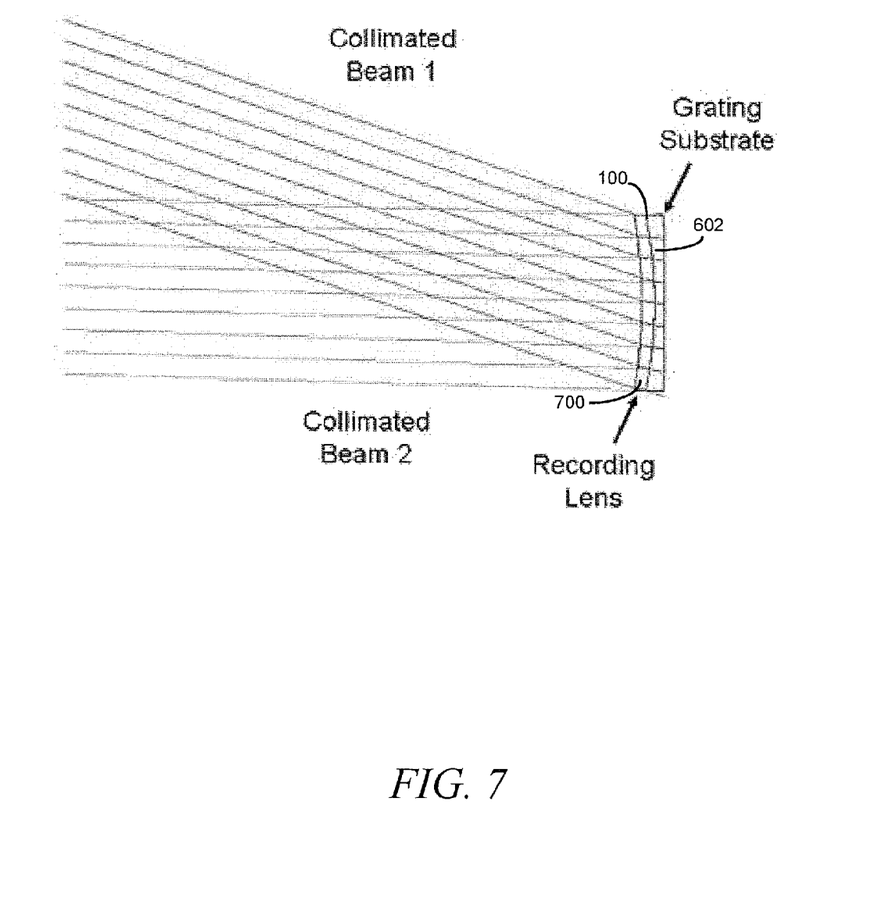
FIG. 7 is a diagram illustrating an alternate method for recording tilted fringes in a curved VPH grating according to an embodiment of the subject matter described herein.

The fabrication of curved VPH gratings may be achieved via a process in which the recording medium, for example dichromated gelatin, is molded onto the curved substrate and then exposed to fringes created by interfering two coherent beams of light, as shown in FIG. 7. Some of the details of the process may be the same as those described above with respect to FIG. 5. For example, the hardened grating material may be placed in a holder in a holographic chamber where it is subjected to interfering beams of collimated laser light originating from a laser light source using an optical setup similar to that illustrated in FIG. 5. Specific differences in recording the fringes in FIG. 7 from the recording process illustrated in FIG. 5 will now be described. In FIG. 5, the angles of incidence of the interfering collimated laser beams to the grating are substantially equal to each other. In the design illustrated in FIG. 7, the angles of incidence of the collimated laser beams on the lens in front of the grating are asymmetric with respect to the center of the lens (not equal to each other). The asymmetry of the incident angles of the beams into grating 100 shown in FIG. 7 is used so that the holographic fringes recorded in the film are titled at large angles to yield efficient diffraction in first order for light incident along the local surface normal.

Close inspection of FIG. 7 shows that the curvature of the surface through which the recording beams enter grating 100 is different from that shown in FIG. 6. Indeed, cover plate 601 is not used during the recording process. Instead, a "recording lens" 700 is used to ensure that fringes 108 are tilted at the appropriate large angle, while still delivering good image quality. The use of a recording lens is another difference of the process illustrated in FIG. 7 from that illustrated in FIG. 5.

In the example illustrated in FIG. 7, collimated recording beams are used. However, the recording process is not limited to using collimated recording beams. In an alternate example, non-collimated beams may be used to achieve a desired optical property. For example, a recording beam that is not collimated, such as a spherical wave, may be used to record fringes that achieve aberration correction.

In the recording arrangement shown in FIG. 7, diffraction grating 100 is a thin layer located between the recording lens 700 and grating substrate 604. When recording is complete, recording lens 700 is removed and replaced by a cover plate 601. Using a recording lens and two beams as shown in FIG. 7 allows the angle of fringes 108 to vary while maintaining substantially constant spacing between fringes 108 as illustrated in FIG. 1. As stated above, the angles of fringes 108 may vary so that the fringe angles are substantially constant with respect to the angles of different light rays traveling through grating 100. The recording arrangement illustrated in FIG. 7 can be contrasted with the arrangement illustrated in FIG. 5. In FIG. 7, the recording optic 700 allows the interference pattern to change near grating 100 by dispersing or diverting the recording beams just before entering grating 100. The short distance between the points of diversion of the recording beams and the gratings allows more accurate control of fringe tilt angles than an arrangement where the interference occurs further from the grating, as illustrated in FIG. 5. It should be noted, however, that the recording arrangement illustrated in FIG. 5 or FIG. 7 may be used to create a diffraction grating for the SGTS design or the retroreflective design, without departing from the scope of the subject matter described herein.

Figure 8:
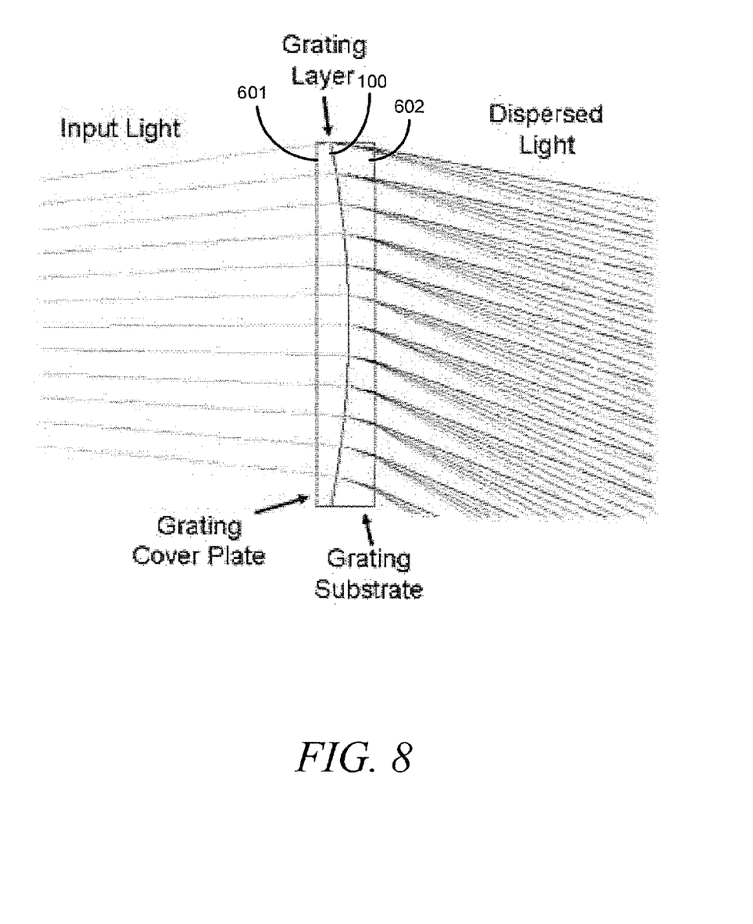
FIG. 8 is a schematic diagram illustrating a curved VPH grating with tilted fringes in a transmissive spectrograph design according to an embodiment of the subject matter described herein.

FIG. 8 shows a sectional view of the passage through the grating of light from stars or other light sources whose spectra are being measured. Although the entrance and exit surfaces shown in FIG. 8 appear flat, they do possess curvature, albeit at a lower level than that of the grating itself.

As described above with respect to the half Offner spectrograph, exemplary applications of the transmissive spectrographs and optical gratings described herein include astronomy, biophysics, lithography, optical coherence tomography, earth imaging, and medical imaging. For example, in astronomy, a STGS spectrograph with a curved optical diffraction grating according to the subject matter described herein may be used in a system, such as a telescope, to disperse an image into a spectral image and to direct the image to a desired location, such as the location of a detector or a cold stop. In spectral domain optical coherence tomography, a spectrograph of the type herein described may be fed with fibers carrying polarized light that has been scattered from a sample to produce a spectral image of an interference pattern that includes depth information about the sample. In earth imaging, a spectrograph with a transmissive optical diffraction grating as described herein may be used to image the ground from an aircraft or satellite, and to disperse the image into separate spectral bands.

Figure 9:
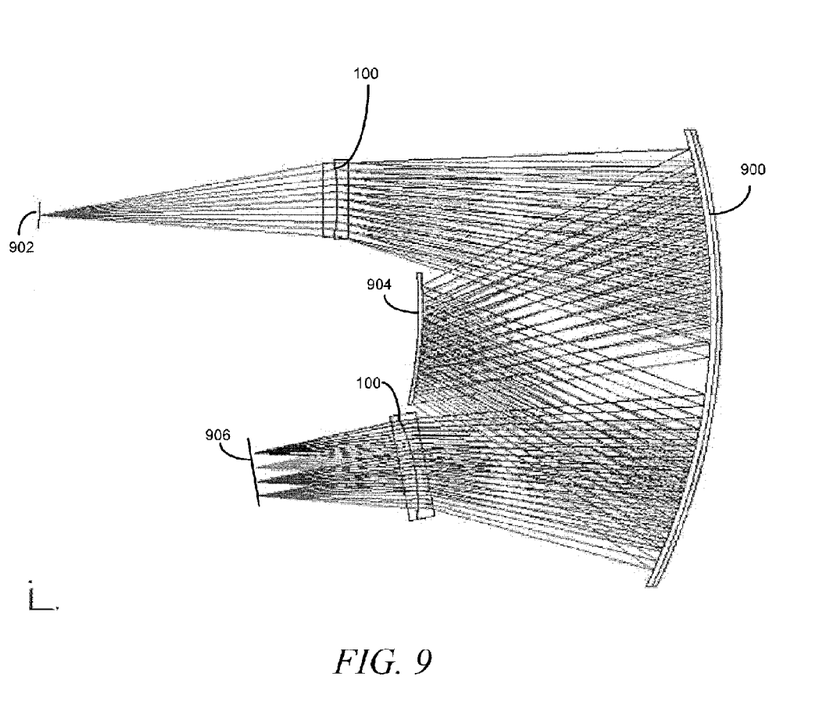
FIG. 9 is a diagram illustrating a full Offner spectrograph design including two curved VPH gratings with tilted fringes according to an embodiment of the subject matter described herein.

FIG. 9 is a schematic diagram illustrating the use of gratings 100 in a full Offner spectrograph according to an embodiment of the subject matter described herein. Referring to FIG. 9, curved gratings 100 with tilted fringes are located at two locations, one to diffract incident light before the light impacts a concave mirror 900 and another to correct aberrations introduced by the first diffraction grating 100. In FIG. 9, light from a light source 902 passes through first diffraction grating 100 where the light is diffracted into its component spectra. From the first diffraction grating 100, the light impacts a first portion of concave mirror 900 where the light is reflected to a convex mirror 904. Convex mirror 904 reflects the light to a second portion of concave mirror 900. The second portion of concave mirror 900 reflects the light through second diffraction grating 100, which corrects aberrations introduced by first diffraction grating 100. From second diffraction grating 100, light passes to focal plane 906.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for making a volume phase holographic diffraction grating, the method comprising:
    placing a gelatin material between a mold and a substrate of desired curvature;
    pressing the mold and substrate together to press the gelatin material into a holographic medium of desired thickness and curvature;
    hardening the gelatin material; and
    holographically encoding fringes in the gelatin material such that the fringes are tilted to diffract at least some of the light that passes through the gelatin material, wherein holographically encoding the fringes includes subjecting the gelatin material to first and second expanded laser beams and using a recording lens positioned in front of the grating, wherein the first and second laser beams strike the recording lens at different angles from each other, pass through the recording lens where they interfere with each other, are diverted and dispersed, and enter the grating to create fringes with tilt angles that vary from each other.

2. The method of claim 1 wherein holographically encoding the fringes includes subjecting the gelatin material to an interference pattern produced by interfering expanded laser beams that strike the grating symmetrically.

3. The method of claim 1 wherein the first and second laser beams are collimated.

4. The method of claim 1 wherein the first and second laser beams are noncollimated.

5. The method of claim 1 comprising placing shims between the mold and the substrate such that the holographic medium has the desired thickness.

* * * * *